United States Patent [19]
Bolan et al.

[11] Patent Number: 5,590,343
[45] Date of Patent: Dec. 31, 1996

[54] TOUCH-SENSITIVE SWITCHING CIRCUITRY FOR POWER-UP

[75] Inventors: Michael L. Bolan, Dallas; Wendell L. Little, Denton, both of Tex.

[73] Assignee: Dallas Semiconductor Corporation, Dallas, Tex.

[21] Appl. No.: 504,228

[22] Filed: Jul. 19, 1995

Related U.S. Application Data

[60] Continuation of Ser. No. 87,239, Aug. 20, 1993, abandoned, which is a division of Ser. No. 998,897, Dec. 28, 1992, Pat. No. 5,249,298, which is a continuation-in-part of Ser. No. 283,268, Dec. 9, 1988, abandoned, and a continuation-in-part of Ser. No. 282,793, Dec. 9, 1988, abandoned, and a continuation-in-part of Ser. No. 283,267, Dec. 9, 1988, abandoned.

[51] Int. Cl.$^6$ .................. G06F 1/30; G06F 1/32
[52] U.S. Cl. ............. 395/750; 395/182.12; 395/182.2; 364/948.4; 364/707
[58] Field of Search .............. 395/750, 182.12, 395/182.2; 364/707

[56] References Cited

U.S. PATENT DOCUMENTS

| | | | |
|---|---|---|---|
| 4,213,061 | 7/1980 | Conner | 307/116 |
| 4,234,920 | 11/1980 | Van Ness et al. | 395/575 |
| 4,251,883 | 2/1981 | Grants et al. | 364/900 |
| 4,296,338 | 10/1981 | Thomas | 307/362 |
| 4,317,054 | 2/1982 | Caruso et al. | 323/313 |
| 4,317,181 | 2/1982 | Teza et al. | 364/707 |
| 4,404,972 | 9/1983 | Gordon et al. | 128/419 |
| 4,409,665 | 10/1983 | Tubbs | 364/707 |
| 4,422,163 | 12/1983 | Olden Kamp | 365/229 |
| 4,461,003 | 7/1984 | Tamaki | 364/900 |
| 4,464,584 | 8/1984 | Hentzschel et al. | 307/296.4 |
| 4,489,394 | 12/1984 | Borg | 395/750 |
| 4,528,629 | 7/1985 | Breitling | 371/62 |
| 4,568,179 | 2/1986 | Durbin et al. | 355/67 |
| 4,580,222 | 4/1986 | Fujii | 371/66 |
| 4,591,782 | 5/1986 | Germer | 324/103 |
| 4,615,005 | 9/1986 | Maejima et al. | 364/200 |
| 4,625,309 | 11/1986 | Hitschke | 371/16.3 |
| 4,627,022 | 12/1986 | Mensink et al. | 364/900 |
| 4,627,060 | 12/1986 | Huong et al. | 371/16.3 |
| 4,628,480 | 12/1986 | Floyd | 364/900 |
| 4,658,352 | 4/1987 | Nagasawa | 364/200 |
| 4,685,065 | 8/1987 | Braun et al. | 364/483 |
| 4,698,748 | 10/1987 | Juzswik et al. | 364/200 |

(List continued on next page.)

OTHER PUBLICATIONS

Allen, "Analog supervisor chip keeps microprocessor out of trouble", 35 *Electron. Des.* No. 10, pp. 104–108 (30 Apr. 1987).

Schwerte, "An analogue supervisory circuit for microcomputers" (in German), 18 *Elektron. Ind.* (West Germany) No. 6, pp. 66,68–70 (1987).

Kroeger, "Peripheral i.c.s. take the burden off micros", 13 *New Electronics* 71 (1980).

Bonicatto, "Reset circuit solves brownout problems", *EDN*, vol 31, No. 21, p. 236, Oct. 16, 1986.

Wolff, "Regulator tracks 3 outputs, monitors controlling uP's pulses", *Electronic Design*, vol. 34, No. 17, pp. 109–113, Jul. 24, 1986.

*Primary Examiner*—Thomas C. Lee
*Assistant Examiner*—Rehana Perveen Krick
*Attorney, Agent, or Firm*—Jenkens & Gilchrist, P.C.

[57] ABSTRACT

A system connects to an external contact pad that comprises a battery, a high-impedance load element powered by the battery and connected to pull a voltage potential of an external contact pad in a particular direction; a power supply connected to receive current from an AC line, the power supply carries a voltage; a switch connected to disconnect the power supply from the AC line; logic module connected to detect a voltage transition on the external contact pad caused when a user touches the external contact pad and to selectively operate the switch when the voltage transition is detected, the logic also connected to the battery and the power supply; and at least one microprocessor connected to be powered by the power supply.

21 Claims, 13 Drawing Sheets

U.S. PATENT DOCUMENTS

| | | | |
|---|---|---|---|
| 4,709,234 | 11/1987 | Forehand et al. | 364/422 |
| 4,742,482 | 5/1988 | Inskeep et al. | 364/900 |
| 4,758,735 | 7/1988 | Ingraham | 307/116 |
| 4,766,567 | 8/1988 | Kato | 371/66 |
| 4,768,147 | 8/1988 | Lamiaux | 364/200 |
| 4,777,626 | 10/1988 | Matsushita et al. | 371/66 |
| 4,783,714 | 11/1988 | Kalina | 364/101 |
| 4,809,280 | 2/1989 | Shonaka | 371/62 |
| 4,851,987 | 7/1989 | Day | 364/200 |
| 4,868,832 | 9/1989 | Marrington et al. | 371/66 |
| 4,897,807 | 1/1990 | Ohsawa | 364/707 |
| 4,922,450 | 5/1990 | Rose et al. | 364/900 |
| 4,933,572 | 6/1990 | Smith et al. | 323/313 |
| 4,945,300 | 7/1990 | Sato et al. | 323/318 |
| 4,964,123 | 10/1990 | Umemoto | 371/12 |
| 4,980,836 | 12/1990 | Carter et al. | 364/483 |
| 4,982,443 | 1/1991 | Komoda | 455/117 |
| 5,095,438 | 3/1992 | Sasaki | 364/431.11 |
| 5,109,163 | 4/1992 | Benhamda | 307/272.3 |

POWER MONITOR, WATCHDOG TIMER, AND PUSHBUTTON RESET

NONMASKABLE INTERRUPT $$V_{SENSE} = \frac{R1 + R2}{R2} \times 2.54$$

$$V_{MAX} = \frac{V_{SENSE}}{2.54} \times 5.00$$

NONVOLATILE SRAM

FRESHNESS SEAL

NOTE: THIS SERIES OF PULSES MUST BE APPLIED DURING NORMAL 5 VOLT OPERATION.

POWER SWITCHING

POWER DOWN

POWER UP

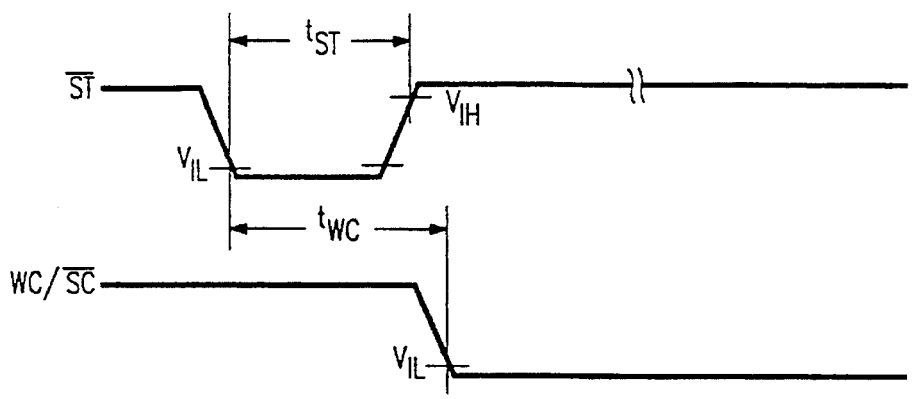
NOTE: SLEEP MODE WILL DISABLE NMI
*FIG. 8*
WAKE/SLEEP CONTROL
*FIG. 9*
INVOKE WAKE POSSIBILITIES
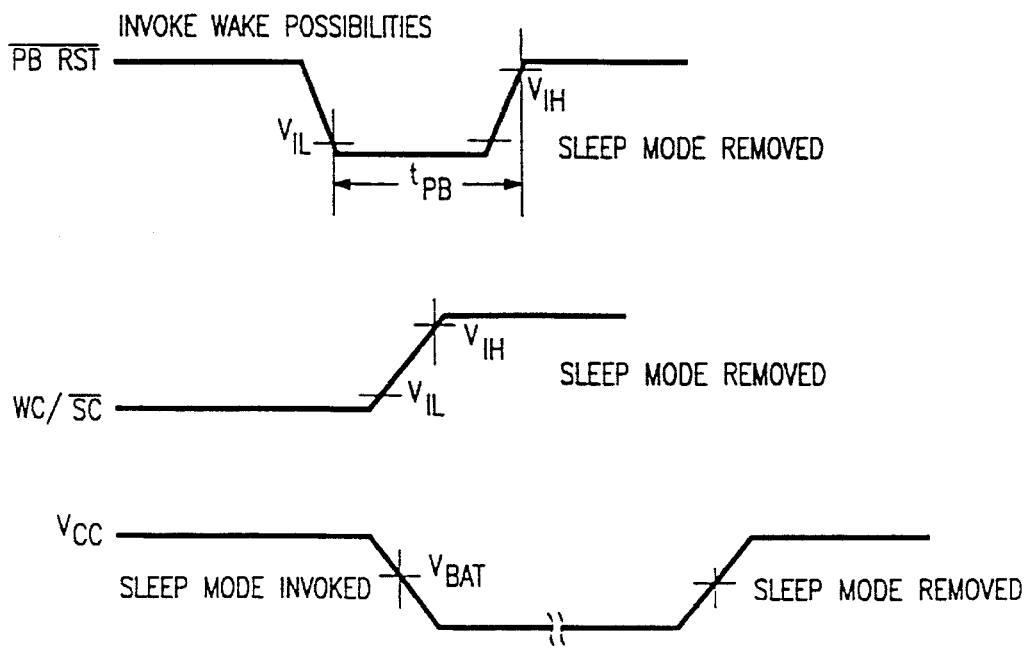

PUSHBUTTON RESET

STROBE INPUT

POWER SUPPLY CONTROL 5,590,343

TOUCH-SENSITIVE SWITCHING CIRCUITRY FOR POWER-UP

This application is a continuation of application Ser. No. 08/087,239, filed on Aug. 20, 1993, which was abandoned upon the filing hereof which is a division, of application Ser. No. 998,897, filed Dec. 28, 1992 which is a continuation-in-part of Ser. No. 283,268, now abandoned, Filed Dec. 9, 1988, entitled "POWER-UP RESET CONDITIONED ON DIRECTION OF VOLTAGE CHANGE"; of Ser. No. 282,793 (now abandoned), Filed Dec. 9, 1988, entitled "SLEEP COMMAND CONDITIONED BY TIMING WINDOW DERIVED FROM STROBE PIN"; and of Ser. No. 283,267 (now abandoned), Filed Dec. 9, 1988, entitled "MICROPROCESSOR AUXILIARY WITH ABILITY TO BE QUERIED RE POWER HISTORY"; each of which is hereby incorporated by reference.

BACKGROUND AND SUMMARY OF THE INVENTION

The present invention relates to systems employing microprocessors, and particularly to integrated circuit elements which help to manage the operation of a microprocessor and/or of a system including a microprocessor. The field of personal computers has expanded upward to include many models and types of computers, with capabilities far beyond those of the earlier high-volume models (such as the IBM PC or the Apple Macintosh). Processor width and speed have increased, bus speed has increased, memory space has increased, and mass storage volume has increased.

However, in some respects such systems have not advanced at all. The most advanced 80386- or 68030-based systems are still turned on and off with a simple manual switch. This is related to a general limitation of conventional microcomputer system architectures: power-up and power-down are still, to a large extent, treated as if they were catastrophic events which are not within the purview of the system designer. The power-up operation of an 80486 system in 1989 is still quite similar to that of a Z80 or 8080 system in 1979. The system handling of these events has not kept pace with the general evolution of microcomputer user interfaces over the 1970s and 1980s. For example, one very frequent problem is accidentally kicking the plug of a microcomputer system, which suddenly removes power from the system and destroys work in progress.

Portable and laptop computers (especially battery-powered units) may include a time-out mechanism which shuts off power to the screen, if no keystrokes are entered for a period of time, until the user again enters a keystroke. However, this type of operation typically does not shut off power to the main processor.

A further significant limitation, from the system designer's point of view, is the necessity to have a large power switch readily accessible. Much effort has been put into designing external housings for computers which permit ready access to all needed functions, and space for all needed connections, and minimum desktop footprint, and convenient monitor size and visibility. Obviously some conflict exists among these criteria, and many industrial designers would be very happy to avoid the need for the power switch to be readily accessible. In many current designs, the power switch is located on the back of the case, where it is not very readily accessible. This is inconvenient for many users. However, in conventional architectures, the power switch must not be too accessible, lest it be accidentally bumped with disastrous results.

A further line of development has been the introduction of battery-powered systems. Advances in display and disk drive technology have greatly increased the functionality which can be included in such a system. Such systems are rapidly gaining in popularity, and offer the potential for many new system applications. However, in most such systems, battery lifetime is always a critical consideration, and any steps which can be taken to reduce power consumption will be very useful. Any reduction in power consumption can be used to provide longer lifetime, more functionality, lighter weight, or lower cost.

Much engineering has been devoted to automatic turn-off and power-saving features in calculators. See, for example, U.S. Pat. Nos. 4,409,665 and 4,317,181, which are hereby incorporated by reference. However, these are much simpler than a full microcomputer system, and do not nearly present the same system issues.

The present invention provides a significant advance in system configuration. In systems according to the present invention, a power-switching device (such as a gate-controlled triac) is used to connect and disconnect a computer system's power supply unit from the power-line connection. This power-switching device is controlled by a battery-powered circuit. The battery-powered circuit monitors a contact, and powers up the system when the user touches the contact. Thus, when the system is powered down, all parts of the system are disconnected from AC power.

In the presently preferred embodiment, this is accomplished by an auxiliary integrated circuit which monitors the contact pad, and causes the rest of the system to be powered up if the user contacts the contact pad. The auxiliary chip of the presently preferred embodiment performs other functions as well, which provide notable system advantages.

In the preferred embodiment, the contact pad can be used at any time to turn the system on or off. The battery-backed circuitry for this control input is configured so that drain on the battery is minimized, and the battery will have a long lifetime (in excess of 10 years) in normal operation.

The contact pad, in the preferred embodiment, is connected to a grounded capacitor, and is normally pulled up by a very weak P-channel pull-up transistor. (In the presently preferred embodiment, this transistor has nominal width/length dimensions of 5/20 microns (in a design where the minimum geometry is 2 microns), and therefore provides a maximum current of only about 10 µA at 3 Volts $V_{BAT}$ supply.) When the user contacts this pad (and discharges the capacitor), the resulting falling edge clocks a flip-flop, and the output of this flip-flop is connected (through an optical isolation stage) to activate the power supply. To avoid battery drain (e.g. if the user accidentally leaves an object in contact with the contact pad while the system is unplugged from the wall socket), a timing circuit is included, which will turn off current to the optical isolator if the system has not powered up within 100–200 msec after the user touches the contact pad.

Of course, a wide variety of switches can be used, in alternative system configurations, to generate the falling edge at the contact pad, and the advantages of the disclosed system architecture can still be obtained.

System designers may choose to locate the contact in a variety of convenient locations. The contact may be located close to the monitor, or close to the keyboard, or remote from the rest of the system (e.g. as a wall panel). The contact may be made very large if desired (e.g. to cover a significant fraction of the external area of the monitor, or of the system box), especially if the system is configured so that the large contact only causes system turn-on, and not turn-off, or if the system includes some software protection against accidental turn-off.

A significant advantage of this system is that the advantages of electronic power switching are obtained, but routing of the line voltage is very restricted. That is, the only parts of the system which are exposed to the full line voltage are the power supply itself, the switching triac, and the opto-isolator. Thus, system design and reconfiguration is simplified, since the vast majority of the electronic components are never exposed to full line voltage.

A separate line of technological progress is the increasing use of batteries, in integrated circuit packages or in very small modules, to provide nonvolatile data retention. Here the driving concern is not the system power budget, but reliability and robustness. The availability of battery backup can be used to ensure that power outages or power-line noise cannot cause loss of data (including configuration data). For example, modern semiconductor technology has provided solid-state memories with such low standby power requirements that a single coin-sized battery can power the memory for ten years of lifetime or more. Such memories are already commercially available.

Low-power microcontrollers have also been commercially available in recent years. An unusual example of such a microcontroller is the DS5000 Soft MicroController™. (This integrated circuit and its data sheet are available from Dallas Semiconductor Corporation, 4350 Beltwood Parkway, Dallas, Tex. 75244, and are both hereby incorporated by reference.) The DS5000 is a microcontroller which has a small battery packaged with it, to provide nonvolatility. Microprocessors and microcontrollers of this kind are extremely useful, since the internal memory of the microprocessor is always preserved. Therefore, the microprocessor can be programmed to "learn" while in service, or to internally store a parameter set which is adjustable throughout the lifetime of the microprocessor. However, aside from their nonvolatility, such microprocessors are typically not the highest-performing microprocessors. Thus, a user who needs nonvolatility may need to make some difficult choices.

The present invention provides an auxiliary integrated circuit, which can interface with a microprocessor (or other complex random logic chip) in a way which improves the microprocessor's power management during power-up and power-down transitions.

The embodiments disclosed in the parent applications provided an auxiliary chip which can provide all necessary functions for power supply monitoring, reset control, and memory back-up in microprocessor based systems. The present application discloses an improved preferred embodiment, which has been enhanced by capability for the touch-initiated "kickstart" function described above.

The systems provided by the disclosed innovative teachings provide all the advantages of software-controlled power-up, while maintaining excellent safety (and regulatory compliance). The systems provided by the disclosed innovative teachings also provide all the advantages of software-controlled power-up, while maintaining good immunity to glitch-induced erroneous system turn-on. The disclosed innovative systems, using an auxiliary chip as described, can provide substantial advantages over conventional systems in some or all of the following areas:

User convenience
System package design
Reliability
Power conservation
Safety (due to use of low voltage)

BRIEF DESCRIPTION OF THE DRAWING

The present invention will be described with reference to the accompanying drawings, which show important sample embodiments of the invention and which are incorporated in the specification hereof by reference, wherein:

FIG. 8 shows the signal timing relations which permit sleep mode to be entered, and FIG. 9 shows the signal timing relations which permit the chip to awaken from sleep mode.

DESCRIPTION OF THE PREFERRED EMBODIMENTS

Figure 1:
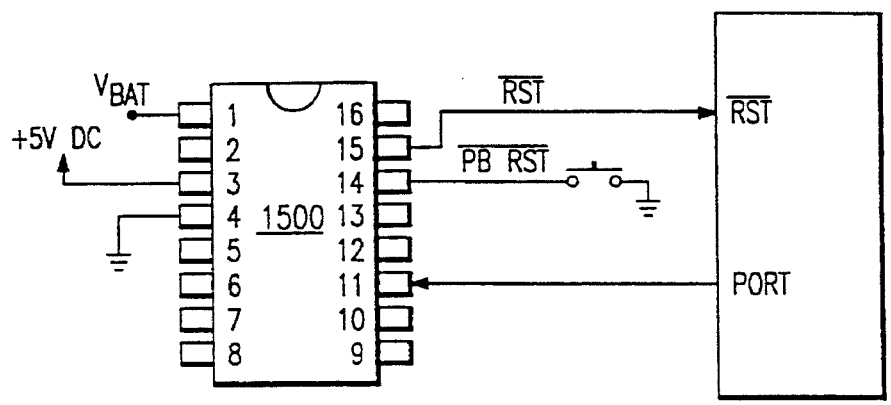
FIG. 1 shows a typical example of the power monitor, watchdog timer, and pushbutton reset.

The numerous innovative teachings of the present application will be described with particular reference to the presently preferred embodiment. However, it should be understood that this embodiment is only one example of the many advantageous uses of the innovative teachings herein. In general, statements made in the specification of the present application do not necessarily delimit any of the various claimed inventions. Moreover, some statements may apply to some inventive features but not to others.

The auxiliary chip of the presently preferred embodiment provides all the necessary functions for power supply monitoring, reset control, and memory backup in microprocessor based systems. A comparator circuit and precise internal voltage reference monitor power supply status. When an out-of-tolerance condition occurs, the microprocessor reset and power fail outputs are forced active, and static RAM control unconditionally write protects external memory. The auxiliary chip also provides early warning of imminent power failure, by driving a non-maskable interrupt when a monitored voltage falls to a user defined voltage threshold. External reset control is provided by a push-button reset input (PBRST*, in the preferred embodiment) which is debounced and activates reset outputs. An internal timer also forces the reset outputs to the active state if the strobe input is not driven low prior to time out. A wake-up/sleep control provides the necessary signal for orderly shut down and start up in battery backup and battery operate applications. A keyboard control system for power supply start up and shut down is provided through the use of the Power Supply Control Input and Output pins.

Some of the features and advantages of the auxiliary chip of the preferred embodiment include the following (but it should be noted that these features do not necessarily define elements of the inventions claimed): it holds microprocessor in check during power transients; Halts and restarts an out-of-control microprocessor; Monitors push button for external override; Warns microprocessor of an impending power failure; Converts CMOS SRAM into nonvolatile memory; Unconditionally write protects memory when power supply is out of tolerance; Consumes less than 100 nA of battery current; Controls external power switch for high current applications; Option to select 10% or 5% power supply monitoring; Provides necessary control for start up and shut down of power supply from keyboard; Provides orderly shutdown in nonvolatile microprocessor applications; and Supplies necessary control for low power "stop mode" in battery operated hand-held applications.

Pin and Signal Names

In the following description, the following pin and signal names may be referred to:

| | |
|---|---|
| $V_{BAT}$ | +3 Volt Battery Input |
| $V_{CCO}$ | Switched SRAM Supply Output |
| $V_{CC}$ | +5 Volt Power Supply Input |
| GND | Ground |
| PF | Power Fail (Active High) |
| PF* | Power Fag (Active Low) |
| WK/SC* | Wake-Up Control (Sleep) |
| PSI* | Power Supply Control Input |
| IN | Early Warning Input |
| NMI* | Non Maskable Interrupt |
| ST* | Strobe Input |
| CEO | Chip Enable Output |
| CEI | Chip Enable Input |
| PBRST* | Push Button Reset Input |
| RST* | Reset Output (Active Low) |
| PSO* | Power Supply Control Output |

Battery-Initiated Touch-Sensitive Power-Up

Figure 15:
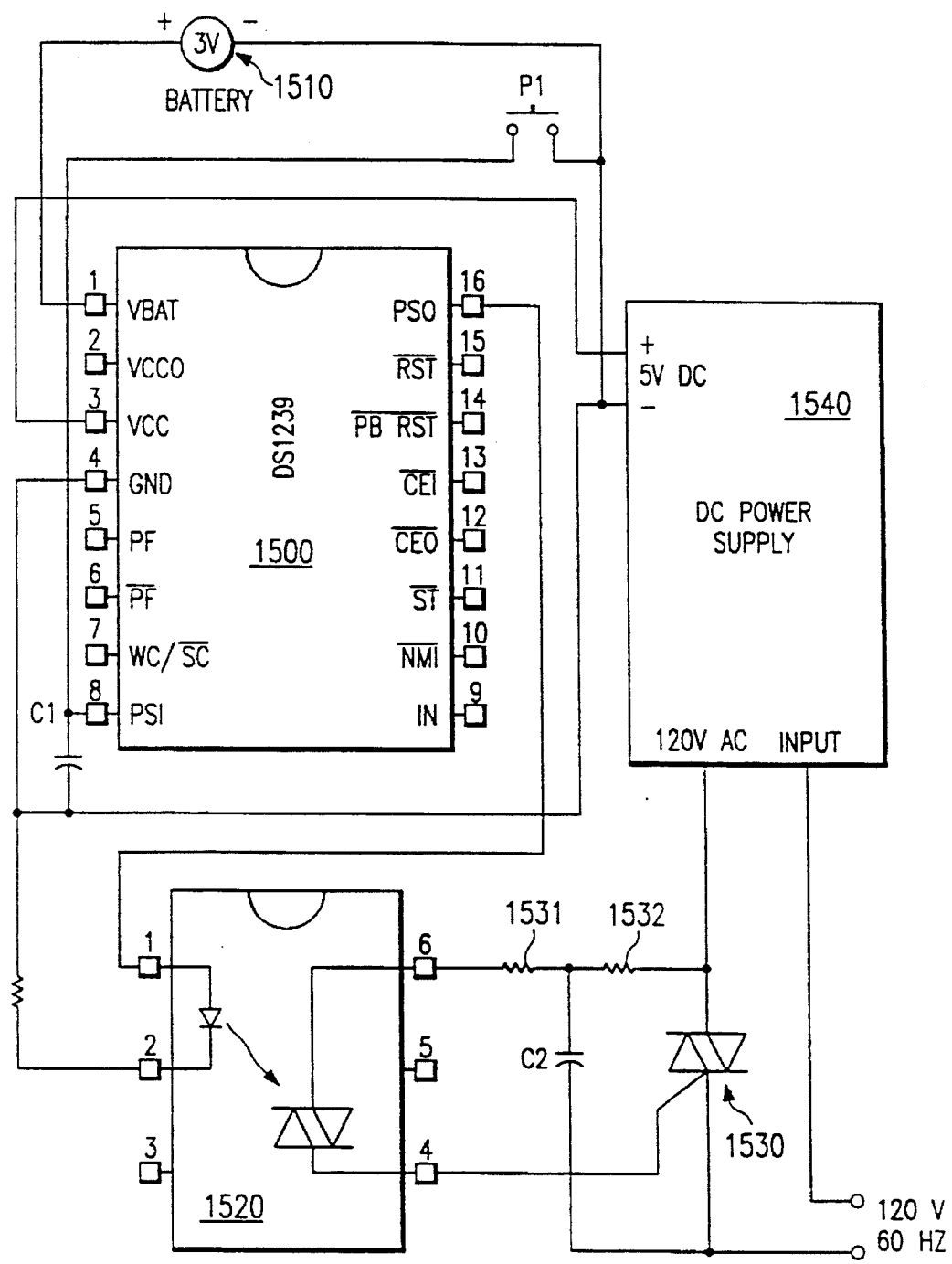
FIG. 15 shows a system, according to the presently preferred embodiment, wherein a battery-powered circuit powers up the entire system whenever the user touches a contact.

FIG. 15 shows a system, according to the presently preferred embodiment, whereto a battery-powered circuit powers up the entire system whenever the user touches a contact.

When the system is off, the user can hit the pushbutton P1. This will discharge capacitor C1, and thus generate a falling edge at terminal PSI* of the auxiliary integrated circuit 1500. Note that the switch P1 can be configured, for example, as a contact pad with concentric rings, or as a one-terminal sensor (which detects user contact by charge-sharing), or in any of a wide variety of other known ways.

The battery 1510 provides a supply voltage to the auxiliary chip 1500 only (at terminal $V_{BAT}$), when the rest of the system is off. The logic thus powered operates, as described below, to detect the falling edge which means that a user has hit the pushbutton, and provides a small DC current at pin PSO*, which is connected to the opto-isolator 1520.

The opto-isolator 1520, in the preferred embodiment, is a commercial pan which includes an LED combined with a photo-activated triac m a small package. This isolator, in the preferred embodiment, is a Motorola MOC3012, which provides 7.5 kV of isolation.

The output of the opto-isolator 1520 is connected to turn on the gate-controlled triac 1530. Only a fraction of the AC line voltage is needed to keep the triac 1530 turned on, so resistors 1531 and 1532 provide a reduced control current at the gate of triac 1530. Capacitor C2 provides a shunt path for transients. (Of come, other power switching arrangements could be used instead, such as SCRs, power MOSFETs, or relays.)

When the triac 1530 is turned on, the conventional power supply 1540 provides current to the auxiliary chip 1500 (at terminal $V_{CC}$), and to the remainder of the system.

Other power control arrangements can be combined with the configuration of FIG. 15, but the arrangement of FIG. 15, of itself, is believed to provide substantial advantages.

Figure 16:
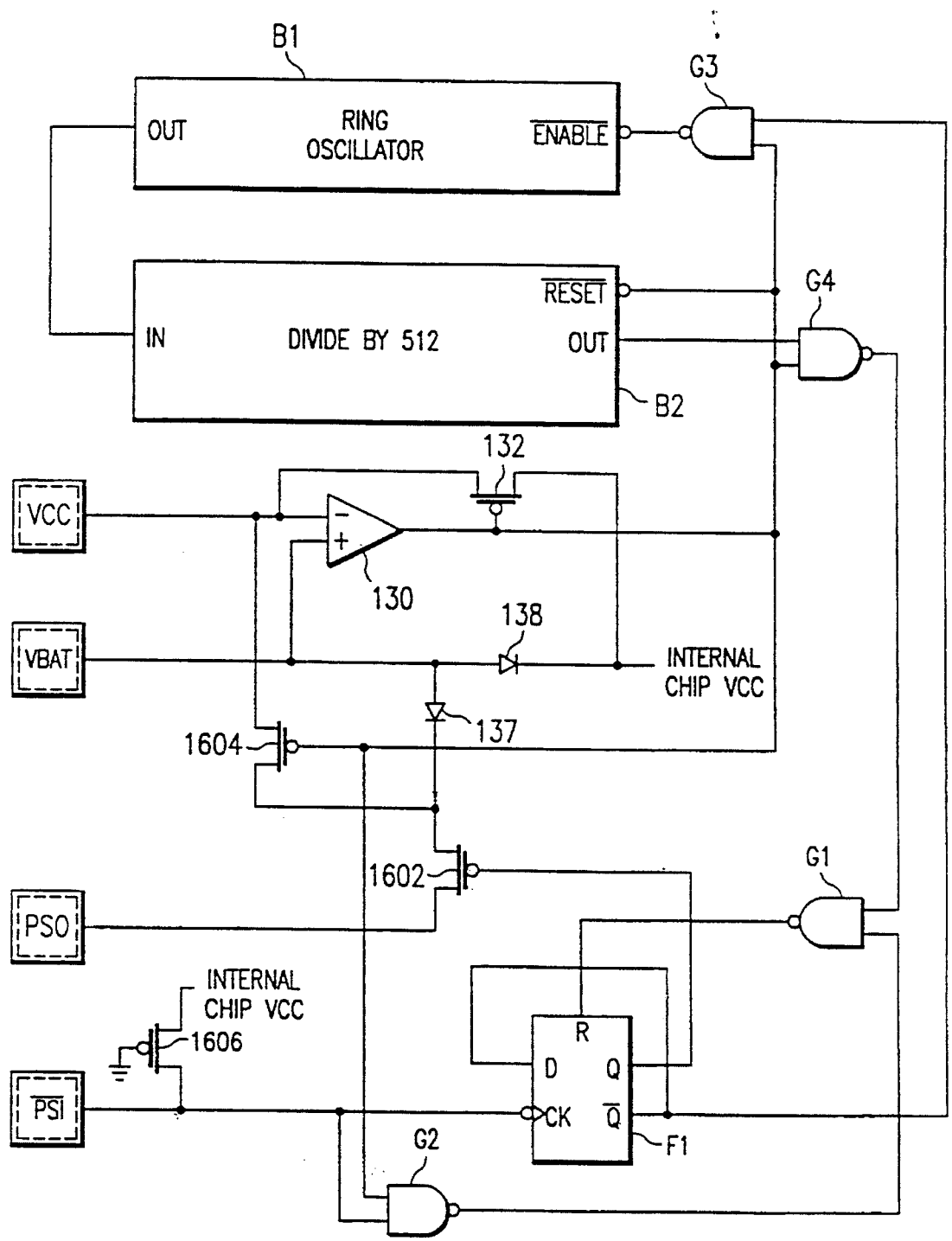
FIG. 16 shows the electrical organization used, in the preferred embodiment, to provide the functionality of the system of FIG. 15.

FIG. 16 shows the electrical organization used, in the preferred embodiment, to provide the functionality of the system of FIG. 15.

Comparator 130 compares the voltage of the system power supply $V_{CC}$ against the battery voltage $V_{BAT}$ and switches transistors 1604 and 132 to power the auxiliary chip from the system power supply when that is higher. Isolation diodes 137 and 138 prevent the battery from being charged by the system supply in this case.

The PSI* input is connected to clock a flip-flop F1. The Q output of this flip-flop controls a PMOS transistor 1602, which connects the output PSO* to the positive supply voltage (which will be obtained via the diode 137 from the battery terminal $V_{BAT}$ if the system power supply voltage $V_{CC}$ is low).

The flip-flop F1 will be reset (through NAND gates G1, G2, and G4) in either of two cases: if the system power supply $V_{CC}$ is low (output of comparator 130 high) and the button has not been pushed (input PSI* high); or if the system power supply $V_{CC}$ is low and the output OUT of the counter B2 has gone high.

The counter B2 provides a time-out function, and is driven by oscillator B1. Oscillator B1 is enabled when the output of gate G3 goes low, which will occur when the system power supply $V_{CC}$ is low (output of comparator 130 high) and the button P1 has been pushed (output Q* of flip-flop F1 is high). Thus, when the chip 1500 is being powered from battery, this time-out function prevents the battery from being depleted (by the current bum of the opto-isolator 1520), if for any reason the contact P1 is left closed. When the flip-flop F1 has been reset, the Q output goes high, to turn off transistor 1602, and the Q* output (which is tied back to the D input) provides a low level, so that Q will go low as soon as the flip-flop is clocked.

Note that the weak transistor 1606 (which, in the preferred embodiment, has dimensions of about 5/20 microns) will slowly pull up the potential of node PSI* whenever the external pushbutton is not being pushed.

Other Features also Provided by the Presently Preferred Embodiment

The auxiliary chip of the presently preferred embodiment also provides a number of other capabilities, which will now be described. Many of these capabilities were also provided by the embodiments disclosed in the parent applications, which provided an auxiliary chip which can provide all necessary functions for power supply monitoring, reset control, and memory back-up in microprocessor based systems. The (improved) preferred embodiment disclosed in the present application has been enhanced by capability for the touch-initiated "kickstart" function described above, but also, in the presently preferred embodiment, includes the functionality disclosed in the parent applications.

Power Monitor

The auxiliary chip employs a bandgap voltage reference and a precision comparator to monitor the 5 volt supply ($V_{CC}$) in microprocessor based systems. When an out-of-tolerance condition occurs, the RST* output is driven to the active state. The $V_{CC}$ trip point ($V_{CCTP}$) is set, for 10% operation, so that the RST* output will become active as $V_{CC}$ falls below 4.5 volts (4.37 typical). The $V_{CCTP}$ for the 5% operation option is set for 4.75 volts (4.62 typical). The RST* signal is excellent for microprocessor control, as processing is stopped at the last possible moment of within-tolerance $V_{CC}$. On power up, the RST* signal is held active for a minimum of 40 ms (60 ms typical) after $V_{CCTP}$ is reached to allow the power supply and microprocessor to stabilize. Notice that when $V_{CC}$ goes out of tolerance (below $V_{CCTP}$) the RST* output is driven active within $t_{RPD}$ (see the timing diagram of FIG. 6). Also, on power up, RST* remains active for $t_{RPD}$ after valid $V_{CC}$.

Watchdog Timer

The auxiliary chip also provides a watchdog timer function by forcing the RST* signal to the active state when the strobe input (ST*) is not stimulated for a predetermined time period. This time period is set for 400 ms typically, with a maximum time-out of 600 ms. The watchdog timer begins timing out from the set time period as soon as RST* is inactive. If a high-to-low transition occurs at the ST* input prior to time-out, the watchdog timer is reset and begins to time out again. To guarantee that the watchdog timer does not time-out, a high-to-low transition must occur within 200 ms or less from watchdog timer reset. If the watchdog timer is allowed to time out, the RST* output is driven to the active state for 50 ms minimum. The ST* input can be derived from microprocessor address, data, and/or control signals. Under normal operating conditions, these signals would routinely reset the watchdog timer prior to time out. If tile watchdog timer is not required, it may be disabled by leaving the ST* input open. The watchdog timer is also disabled as soon as $V_{CC}$ falls to $V_{CCTP}$. The watchdog will then become active again when $V_{CC}$ rises above $V_{CCTP}$.)

Push-button Reset

Two input pins are provided on the auxiliary chip for direct connection to pushbutton controls: the push-button reset input PBRST*, and the power-up control input PSI*.

The push-button reset input PBRST* requires an active low signal. Internally, this input is pulled high by a resistance of about 10K whenever $V_{CC}$ is greater than $V_{BAT}$. The PBRST* pin is also debounced and timed so that the RST* output is driven to the active state for 50 ms minimum. This 50 ms delay beans as the pushbutton is released from a low level. The PBRST* input is disabled whenever $V_{CC}$ is below $V_{BAT}$.

A typical example of the power monitor, watchdog timer, and push-button reset is shown in FIG. 1. The auxiliary chip 1500 receives a battery power input $V_{BAT}$ and is also connected to ground and (at pin $V_{CC}$) to the system power supply. The auxiliary chip 1500 provides a reset output RST*, which is connected to a microprocessor 100 (such as a Motorola MC6805). A reset input to the auxiliary chip 1500 is provided at the PBRST* terminal. (Of course, this input need not be connected solely to a pushbutton; this input could also be driven by the output of an analog sensor, or another integrated circuits, if desired.)

Figure 11:
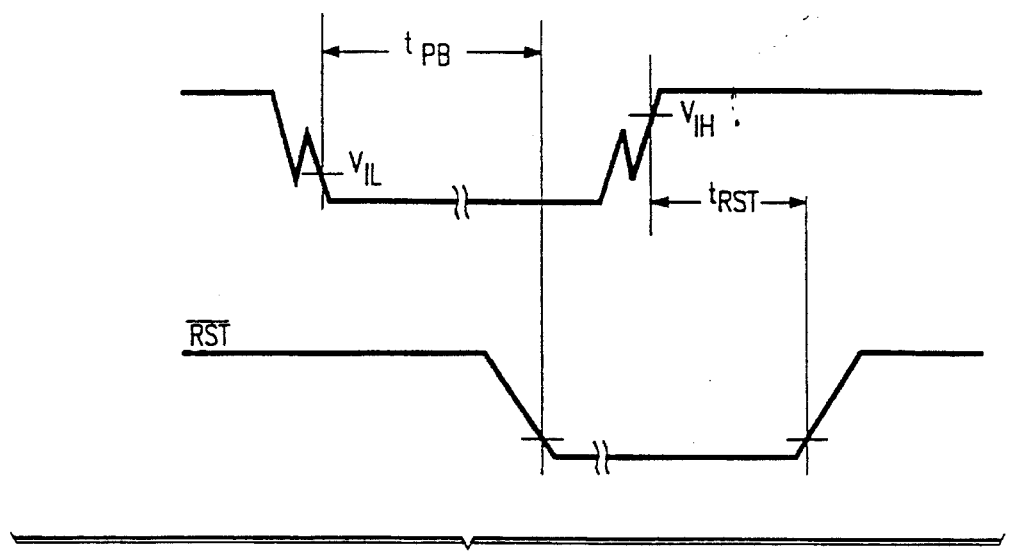
FIG. 11 shows the timing relation between the PushButton Reset (PBRST*) and RST* signals.

A detailed timing diagram of the PBRST* function is provided in FIG. 11. Note that voltage swings are shown in the PBRST input, to show how the auxiliary chip debounces this input.

Nonmaskable Interrupt.

The auxiliary chip 1500, in the presently preferred embodiment, also generates a non-maskable interrupt NMI* for early warning of power failure to a microprocessor. The microprocessor can use this early warning to perform state save operations in software.

Figure 2:
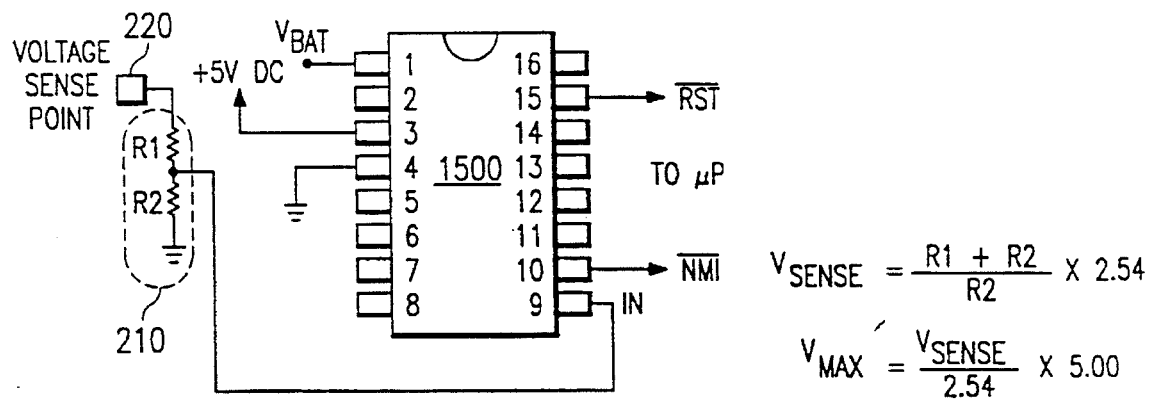
FIG. 2 shows how the high impedance input at the IN pin allows for a user to define a sense point, using a simple resistor voltage divider network to interface with high voltage signals.

A precision comparator 130 (seen in FIG. 13) monitors the voltage level at the input pin IN, relative to a reference voltage generated by the internal bandgap reference circuit. The IN pin of the auxiliary chip 1500 is a high impedance input allowing for a user defined sense point using a simple resistor voltage divider network (network 210 in FIG. 2) to interface with high voltage signals. The connection to this sense point 220 may be derived from the regulated 5 volt supply, or from a higher DC voltage level closer to the AC power input. Since the IN trip point $V_{TP}$ is 2.54 volts, the proper values for $R_1$ and $R_2$ can easily be determined as shown. Proper operation of the auxiliary chip requires that the voltage at the IN pin be limited to $V_{IL}$ (the input low level). Therefore, the maximum allowable voltage at the supply being monitored ($V_{MAX}$) can also be derived as shown. A simple approach to solving this equation is to select a value for $R_2$ of high enough impedance to keep power consumption low, and solve for $R_1$. The flexibility provided by this user option allows for detection of power loss at the earliest point in a power supply system, maximizing the amount of time for microprocessor shut-down between NMI* and RST*. When the supply being monitored decays to the voltage sense point, the auxiliary chip drives the NMI* output to the active state for a minimum of 200 microseconds, but does not hold it active.

The NMI* power fail detection circuitry also has built in time domain hysteresis. That is, the monitored supply is sampled periodically at a rate determined by an internal ring oscillator running at approximately 30 KHz (33 μsec per cycle). Three consecutive samplings of out-of tolerance supply (below $V_{SENSE}$) must occur at the IN pin to activate NMI. Therefore, unless the supply voltage remains below the voltage sense point for approximately 100 microseconds, the comparator will reset and the NMI will not be generated.

Figure 10:
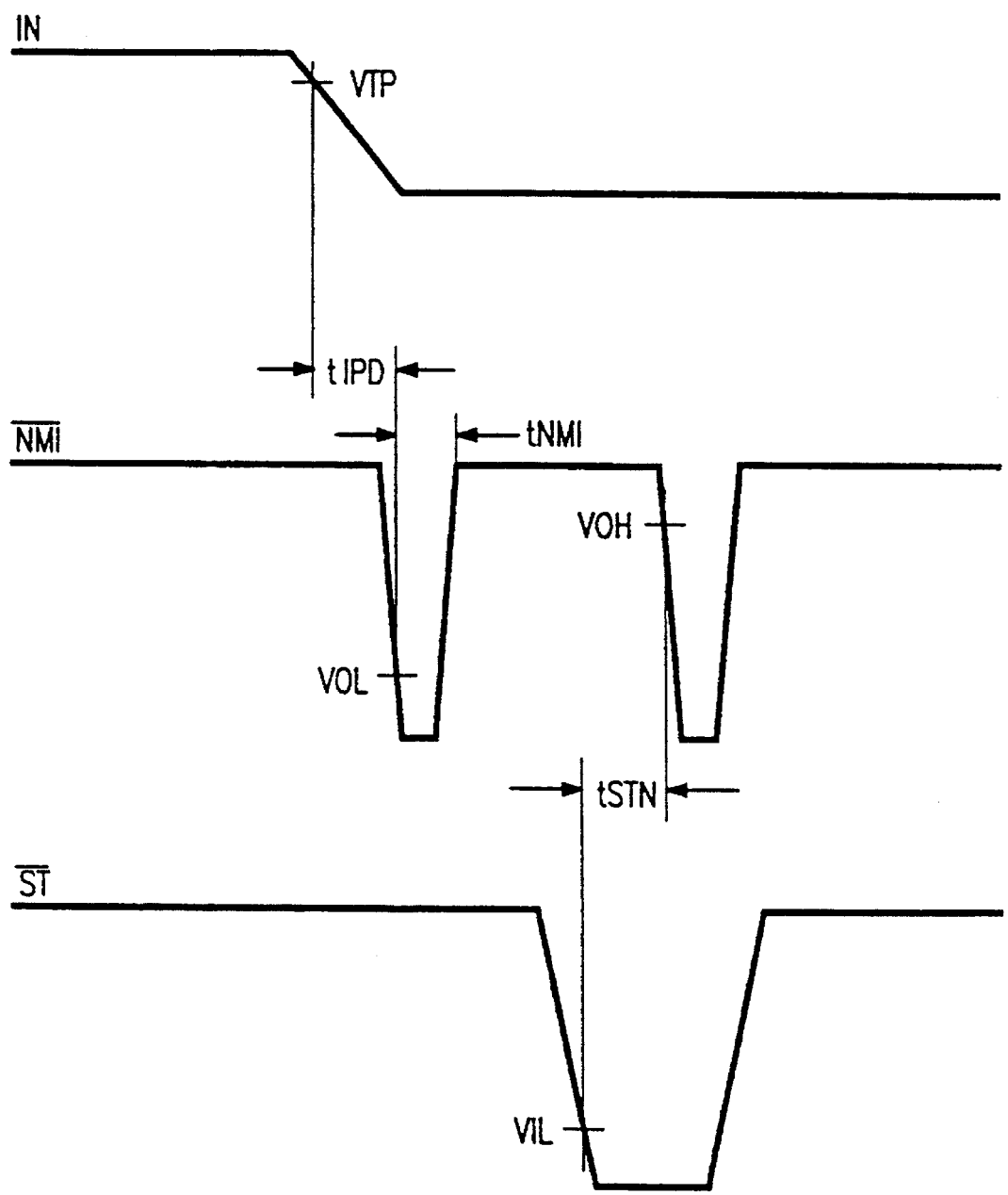
FIG. 10 shows the timing relation between the NMI* and ST* signals.

During power down, when $V_{CC}$ falls out of tolerance (i.e. below $V_{CCTP}$), NMI will pulse low for a minimum of 200 microseconds, and then return high (to $V_{CC}$) until the $V_{CC}$ supply decays to $V_{BAT}$, at which point NMI will enter tristate (see the timing diagram of FIG. 6). If during power up the IN pin voltage is less than $V_{TP}$ for a period of $t_{IPD}$ following the transition of $V_{CC}$ past $V_{CCTP}$, the NMI will pulse low for $t_{NMI}$, and then will follow $V_{CC}$. The NMI output pin will also pulse low for $t_{NMI}$ following any low voltage detect, at the IN pin, of $V_{TP}$. As long as the IN pin input is less than $V_{TP}$, stimulation of the ST* input will result in additional NMI pulses (as seen in FIG. 10).

The NMI* signal has been defined, in the presently preferred embodiment, as a pulse, rather than a level, because a constant output would keep some microprocessors from going into their lowest-power mode. Thus, the microprocessor cannot simply scan the NMI* signal to see where the power supply voltage level is.

However, the microprocessor can query the auxiliary chip to see where the power supply level is. Whenever the auxiliary chip receives a pulse from the microprocessor on the ST* line, it will return a pulse to the microprocessor on the NMI * line, but only if the system supply voltage is less than that required to trip the NMI* interrupt. This timing relation is shown in detail in FIG. 10.

Figure 14:
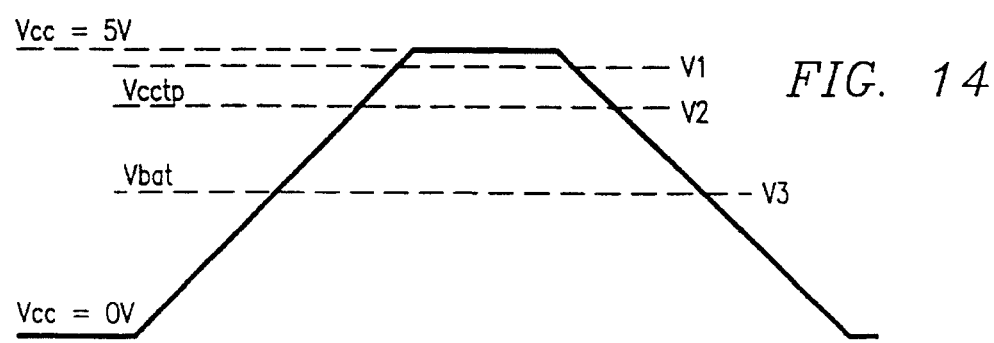
FIG. 14 shows the critical points on the curve of power supply voltage, when the power supply voltage is falling.

FIG. 14 (which is a greatly simplified version of FIGS. 6 and 7) shows this relationship more clearly. In this diagram, $V_1$ refers to the voltage at which the auxiliary chip generates an interrupt (on line NMI*, in the presently preferred embodiment); voltage $V_2$ is the voltage at which the auxiliary chip generates a reset (this is equal to voltage $V_{CCTP}$, in the presently preferred embodiment); and voltage $V_3$ is the voltage at which comparator 130 connects the internal $V_{CC}$ to $V_{BAT}$ rather than to $V_{CCI}$ (which is the externally supplied power voltage, as opposed to the on-chip supply $V_{CC}$). Correspondingly, several voltage domains are indicated:

in domain 1, $V_{CCI} > V_1$;

in domain 2, $V_1 > V_{CCI} > V_2$;

in domain 3, $V_2 > V_{CCI} > V_3$.

The microprocessor can send a query to the auxiliary chip by pulsing the strobe pin ST*. When this occurs, the auxiliary chip will reply with a pulse on line NMI* if the supply level is then in zone 2, but not if the power supply level is in zone 1. Thus, the microprocessor can use this exchange to recognize whether it is in zone 2.

Figure 12:
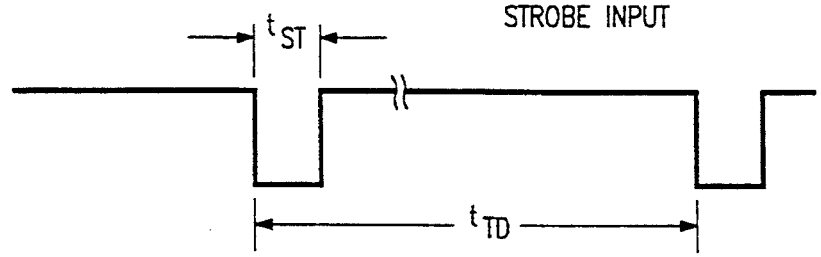
FIG. 12 shows the timing relation whereby the Strobe Input can prevent a Watchdog RST* signal.

FIG. 12 schematically shows timing constraints on the strobe input ST*. Note that pulses of at lest $t_{TD}$ must appear at intervals of no more than $t_{TD}$, or the watchdog circuitry will send a reset command to the microprocessor.

Memory Backup

The auxiliary chip of the presently preferred embodiment also provides all necessary functions required to battery backup a static RAM. First, a switch is provided to direct power from the incoming 5 volt supply ($V_{CC}$) or from a battery ($V_{BAT}$), whichever is greater. Second, the same power fail detection described in the power monitor section is used to inhibit the chip enable input (CEI*) and hold the chip enable output (CEO*) to (typically) ($V_{BAT}$—0.7) Volts. This write protection mechanism occurs as $V_{CC}$ falls below $V_{CCTP}$, as described previously.)

If the chip enable input CEI* is low (active) at the time power fail detection occurs, then the chip enable output CEO* is held low (active) until either CEI* is returned high, or the period tee expires. This timing relation causes write protection to be delayed so that any current memory cycle can be completed. This prevents the corruption of data due to partial writes.) If CEO* is in an inactive state at the time of $V_{CC}$ fail detection, CEO* will be unconditionally disabled within $t_{CF}$. While the supply voltage is within normal limits, CEO* will simply follow CEI*, with a maximum propagation delay of 20 ns.

Figure 3:
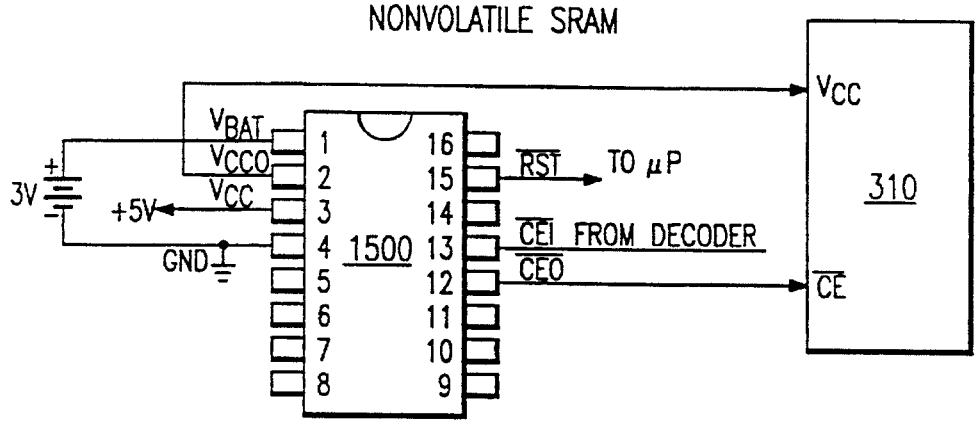
FIG. 3 shows a typical nonvolatile SRAM application.

FIG. 3 illustrates the use of the auxiliary chip to nonvolatize one or more SRAM memories 310. Note that supply voltage output $V_{CCO}$ is connected to the $V_{CC}$ power input of the SRAM 310, and the chip enable output CEO* is connected to the SRAM's chip enable input CE*. If nonvolatile operation is not required, the battery input pin $V_{BAT}$ must be grounded. In order to conserve battery capacity during storage and/or shipment of a system, the auxiliary chip, in the presently preferred embodiment, provides a "freshness seal" mode, in which it electronically disconnects the battery.

Figure 4:
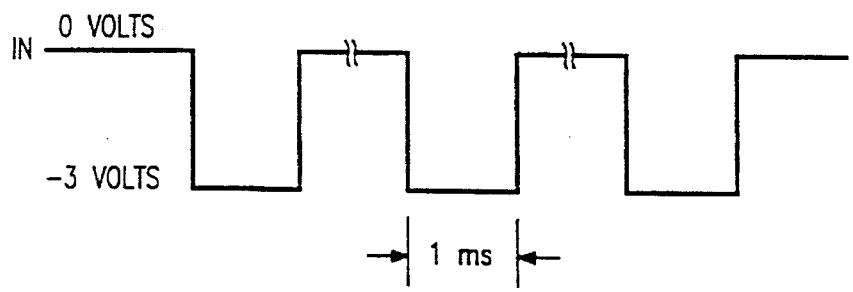
FIG. 4 depicts the three negative pulses on the IN pin which are used to invoke the freshness seal.

FIG. 4 is a timing diagram which depicts the three pulses below ground, each or at least 1 msec duration, which (if applied to the IN pin, will invoke the freshness seal. The freshness seal will be disconnected, and normal operation will begin, when $V_{CC}$ is next applied to a level above $V_{BAT}$.

Power Switching

Figure 5:
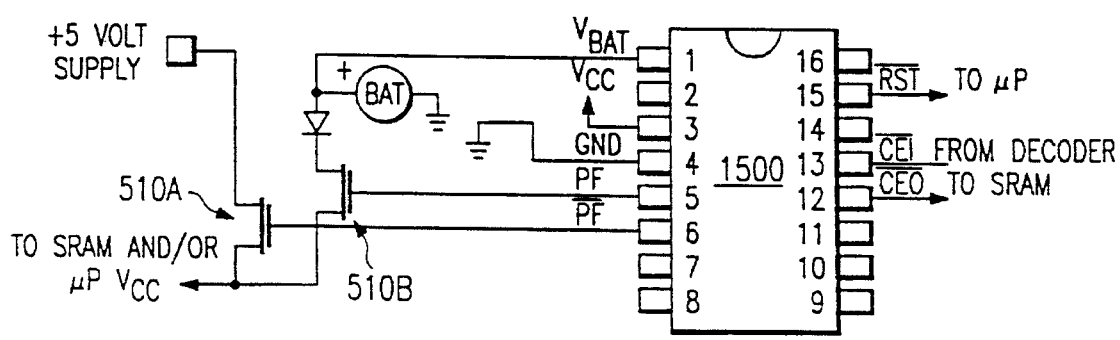
FIG. 5 shows how the external supply voltage is switched by discrete transistors, controlled by power-fail signal PF and its complement PF*.

For certain high current battery backup applications, the 5 volt supply and battery supply switches internal to the auxiliary chip may, not be large enough to support the given load within significant voltage drop. For these applications, the PF and PF* outputs are provided to gate external switching devices. For example, in FIG. 5, the two NMOS discrete devices 510A and 510B are used to source current (for power supply to SRAMs or other integrated circuits) from either the system power supply or the battery, depending on the logic signals PF and PF*. Thus, if needed, external power devices can be used to switch supply from $V_{CC}$ to battery on power down and from battery to $V_{CC}$ on power up. The transition threshold for PF and PF* is set to the external battery voltage $V_{BAT}$ (as may be seen in the timing diagram of FIG. 6). The load applied to the PF pin from the external switch 510 will be supplied by the battery. Therefore, this load should be taken into consideration when sizing the battery.

Wake Control/Sleep Control

The Wake/Sleep Control input WK/SC* allows the processor to disable all comparators on the auxiliary chip, to maintain nonvolatility in the lowest power mode possible. In battery-operated applications, the processor may invoke the sleep mode to conserve capacity when an absence of activity is detected.

The auxiliary chip may subsequently be restarted by a high to low transition on the PBRST* input. Externally, the PBRST* input can be connected to provide sensing of human interface, by a keyboard, touch pad, etc.

When the processor has entered sleep mode, it will eventually be restarted as the watchdog timer times out and drives RST* active. The auxiliary chip can also be woken up by forcing the WK/SC* pin high from an external source. Also, if the auxiliary chip is placed in a sleep mode by the processor, and system/power is lost, the auxiliary chip will wake up the next time $V_{CC}$ rises above $V_{BAT}$. (As noted, when the processor invokes the sleep mode during normal power valid operation, all operation on the auxiliary chip is disabled, thus leaving the NMI* and RST* outputs disabled as well as the ST* and IN inputs.) The PBRST* input will also become inactive when the main battery supply falls below the backup 3 volt supply at $V_{BAT}$. Subsequent power up with a restored $V_{CC}$ supply will activate the standard operation of the NMI and RST* outputs as the main supply rises above $V_{CCTP}$. Further detail regarding wake/sleep control may be seen in the timing diagram of FIGS. 8 and 9. (FIG. 8 shows the signal timing relations which permit sleep mode to be entered, and FIG. 9 shows the signal timing relations which permit the chip to awaken from sleep mode.) A high to low transition on the WK/SC* pin must follow a high to low transition on the ST* pin, with a delay of at most $t_{WK}$, in order to invoke a "sleep" mode for the auxiliary chip.

Control of Power Supply

The auxiliary chip also provides the necessary input and output controls to facilitate the power up and power down sequencing of a main power supply from a keyboard or push button entry.

Prior to establishing a voltage on $V_{CC}$, the power supply control input PSI* is internally held at a high level at all times with the $V_{BAT}$ supply. When PSI* is forced low (via a key pad or other source), the power supply control output PSO* is connected to $V_{BAT}$ to provide a high level. This active high signal can be wired directly to an optically isolated SCR to initiate an AC to DC power up sequence (see FIG. 6). This in turn will provide the supply voltage for $V_{CC}$.

Figure 18:
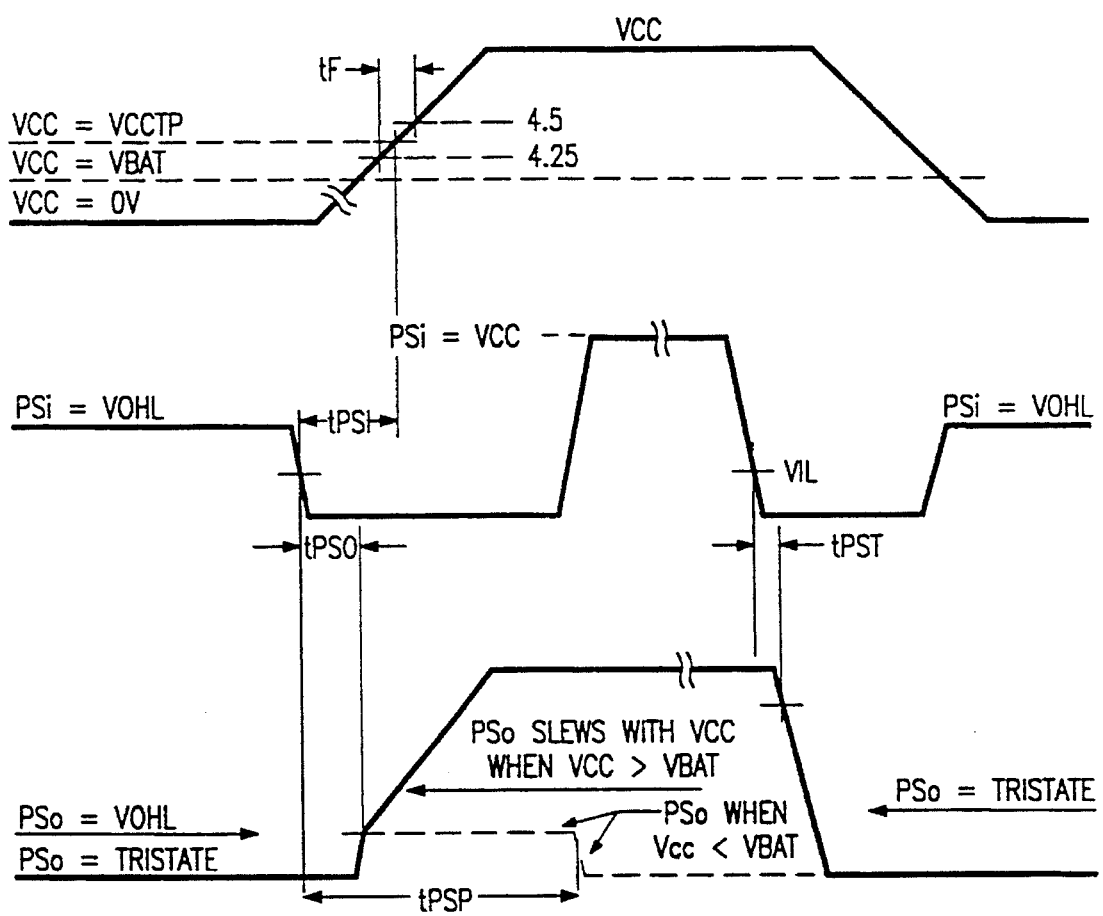
FIG. 18 shows the timing relation between PSI", PSO*, and $V_{CC}$.
Figure 19:
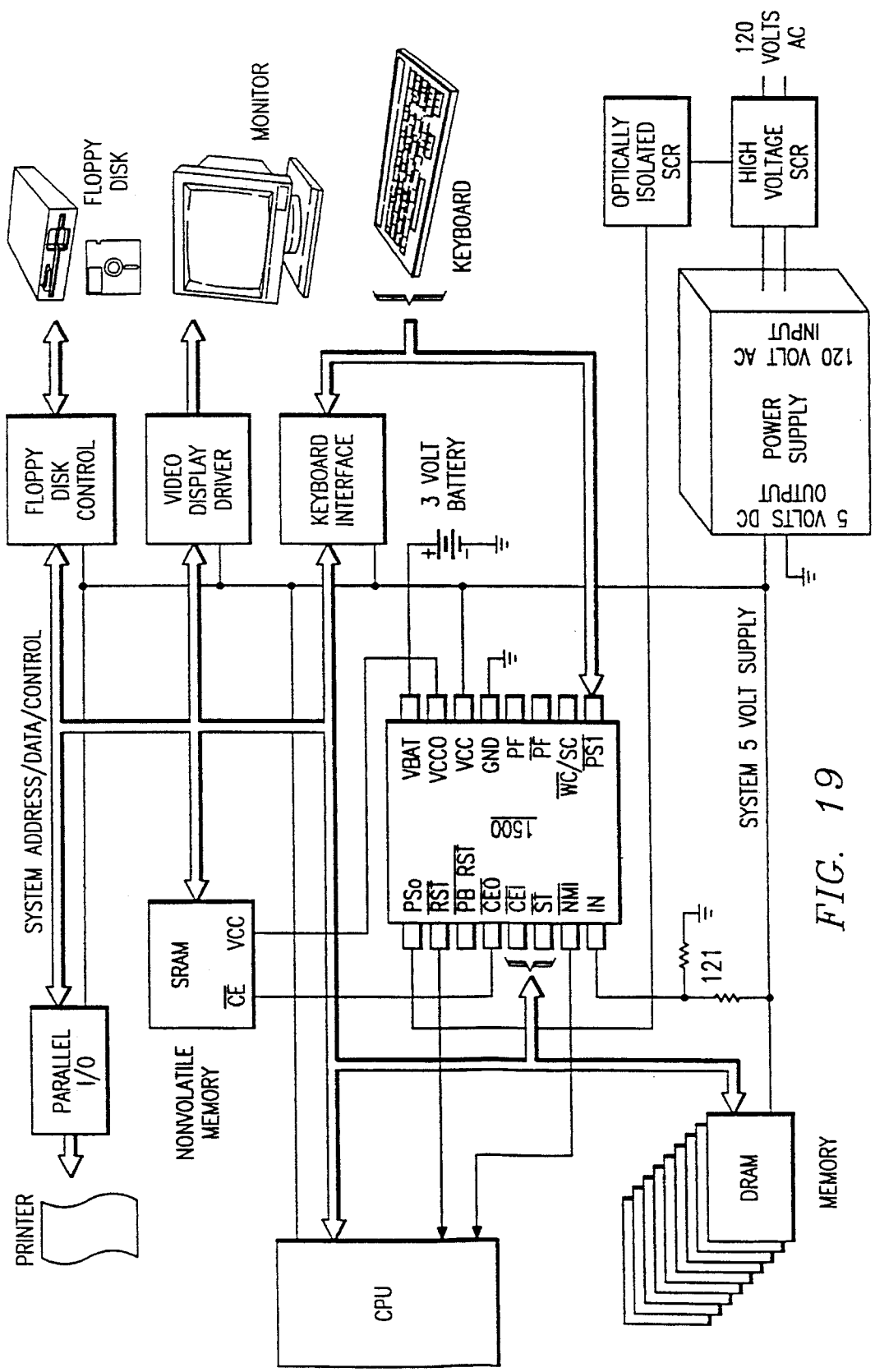
FIG. 19 shows an example of a complete microprocessor-base computer system which includes an auxiliary chip as described.

While the PSI* input is low, the PSO* output will supply a connection to the $V_{BAT}$ pin for no more than 500 ms. If the supply voltage; on $V_{CC}$ rises above the $V_{BAT}$ level before the $t_{PSP}$ time-out, the PSO* pin will remain high and track the $V_{CC}$ input. If $V_{CC}$ does not rise above $V_{BAT}$ before $t_{PSP}$, or if PSI* is allowed to return to a high level before $t_{PSP}$, assuming $V_{CC}$ remains less than $V_{BAT}$ the PSO* output will return to tristate. Once the PSO* output and $V_{CC}$ are set at a high level a subsequent negative edge on PSI* will tristate PSO* to initiate a shut down condition (see FIG. 18). The 10 micoamp current supplied by the PSI* pin allows the use of a 10 µF capacitor as a simple push button debounce circuit.

Electrical Organization of Preferred Embodiment

The actual implementation of the integrated circuit of the preferred embodiment will now be described in detail.

Circuit Architecture

Figure 13:
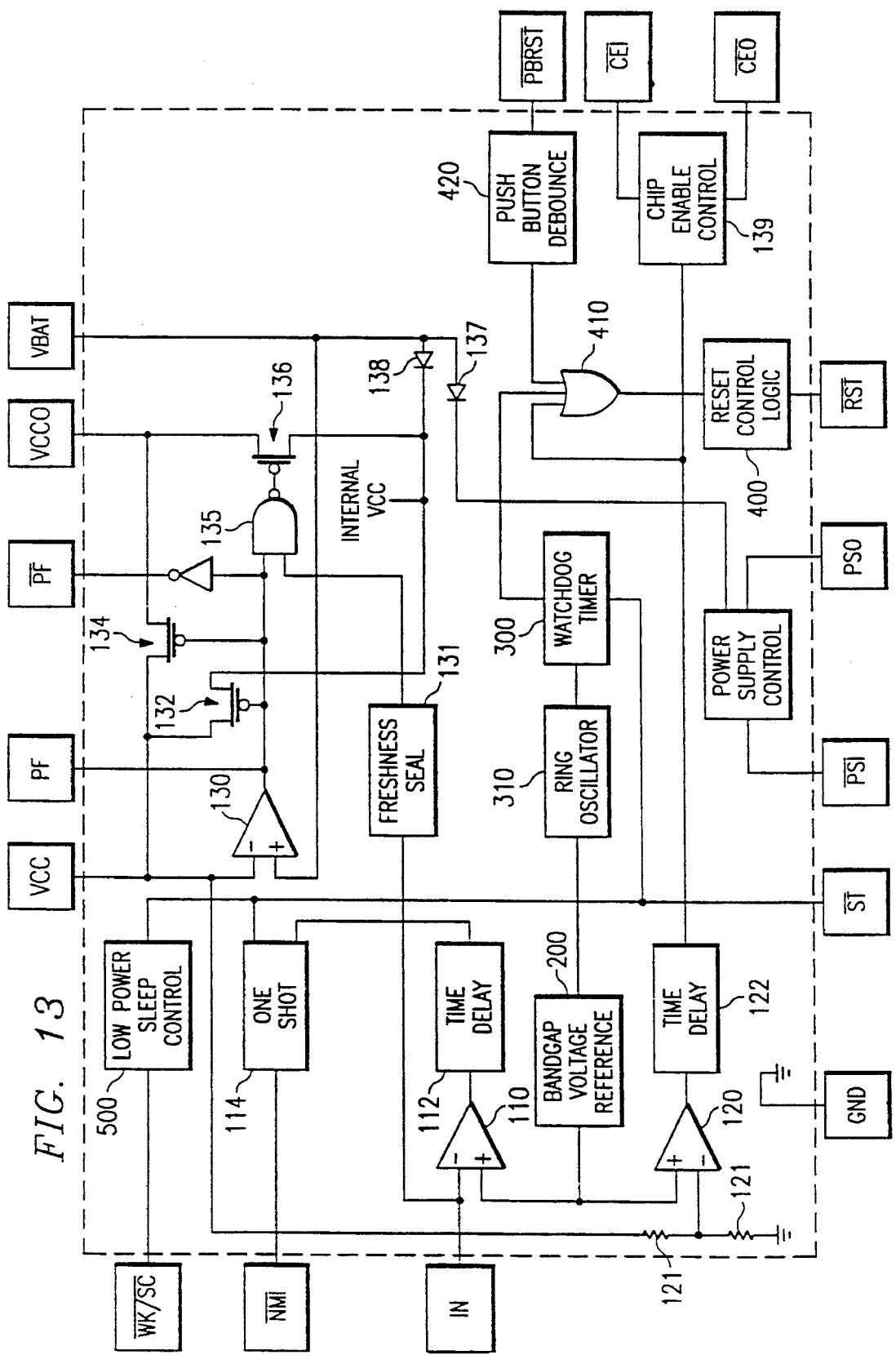
FIG. 13 shows the circuit organization of the auxiliary chip of the presently preferred embodiment.

FIG. 13 shows the overall electrical organization of the auxiliary chip of the presently preferred embodiment.

A first comparator 110 compares the input voltage at the IN pin with the reference voltage provided by bandgap voltage reference generator 200. The output of this comparator is connected through time delay stage 112 to one-shot 114. Thus one-shot 114 will provide a pulse on the NMI* output pin when comparator 110 sees that the voltage at pin IN has fallen below limits. (As noted, a resistive divider network would commonly be used to scale the supply voltage appropriately for this comparison.)

A second comparator 120 compares a fraction of the supply voltage input $V_{CCI}$ (scaled by resistors 121) with the reference voltage provided by bandgap voltage reference generator 200. The output of this comparator 120 is connected, through time delay stage 122 and OR gate 410, to the reset output RST*.

Note that the output of comparator 120 is also connected (through the time delay block 122) to control a chip-enable-control gate 139, so that incoming chip-enable signals CEI* will not be passed through to signal CEO* when $V_{CC}$ has fallen below $V_{CCTP}$.

A third comparator 130 compares the external $V_{CC}$ supply voltage input ($V_{CCI}$) against the battery voltage $V_{BAT}$, and switches large transistors 132, 134, and 136 (via NAND gate 135) appropriately, to connect the external power supply output $V_{CCO}$ and the internal power supply lines $V_{CC}$ to $V_{BAT}$ if $V_{CCI}$ falls significantly below $V_{BAT}$.

The NAND gate 135 also receives an input from freshness seal logic 131, so that, if the input from freshness seal logic 131 is low, transistor 136 will never turn on. In this case, if the external power supply $V_{CCI}$ fails, comparator 130 will drive its output PF positive, turning off transistors 132 and 134, and pin $V_{CCO}$ will be floated. This avoids any loss of battery lifetime due to drain from external devices. The freshness seal logic 131 decodes signals received on the IN pin, as described above, to enter the freshness-seal mode.

The output of the bandgap voltage reference 200 is also used by a current source (not separately shown), which provides a temperature-independent current to the ring oscillator. This current source also provides a temperature-independent current to the voltage reference 200. The voltage reference 200 uses this current to define charging relationships, and also makes use of the output of the ring-oscillator (to chopper-stabilize the comparators). The ring oscillator 310 provides a constant-frequency output to watchdog timer 300. The watchdog timer 300 provides timing and alarm functions, such as those performed by commercially available pan DS1286. (This integrated circuit and its data sheet are available from Dallas Semiconductor Corporation, 4350 Beltwood Parkway, Dallas, Tex. 75244, and are both hereby incorporated by reference.) In particular, the watchdog timer will provide an input to OR gate 410 to generate a reset, if it counts down through its time-out limit without having received a pulse on pin ST*. The sleep-control logic 500 receives inputs from the WK/SC* pin and also from the ST* pin. The outputs of this logic (not shown) can disable not only watchdog timer 300, but also are connected to disable bandgap voltage reference 200, oscillator 310, and comparators 110 and 120. Comparator 130 is not disabled, but is switched into a low-power mode. In comparator 130's low-power mode, its bias current is reduced, so that, although it can still detect when $V_{CCI}$ falls below $V_{BAT}$ it reacts more slowly.

The third input to the OR gate 410 is from the pushbutton input PBRST*, which is cleaned up by debounce logic 420. Thus, the user can manually initiate a reset of the microprocessor at any time, without power-cycling the whole system, simply by hitting a pushbutton (or equivalent) connected to this logic input.

Physical Layout

Figure 17:
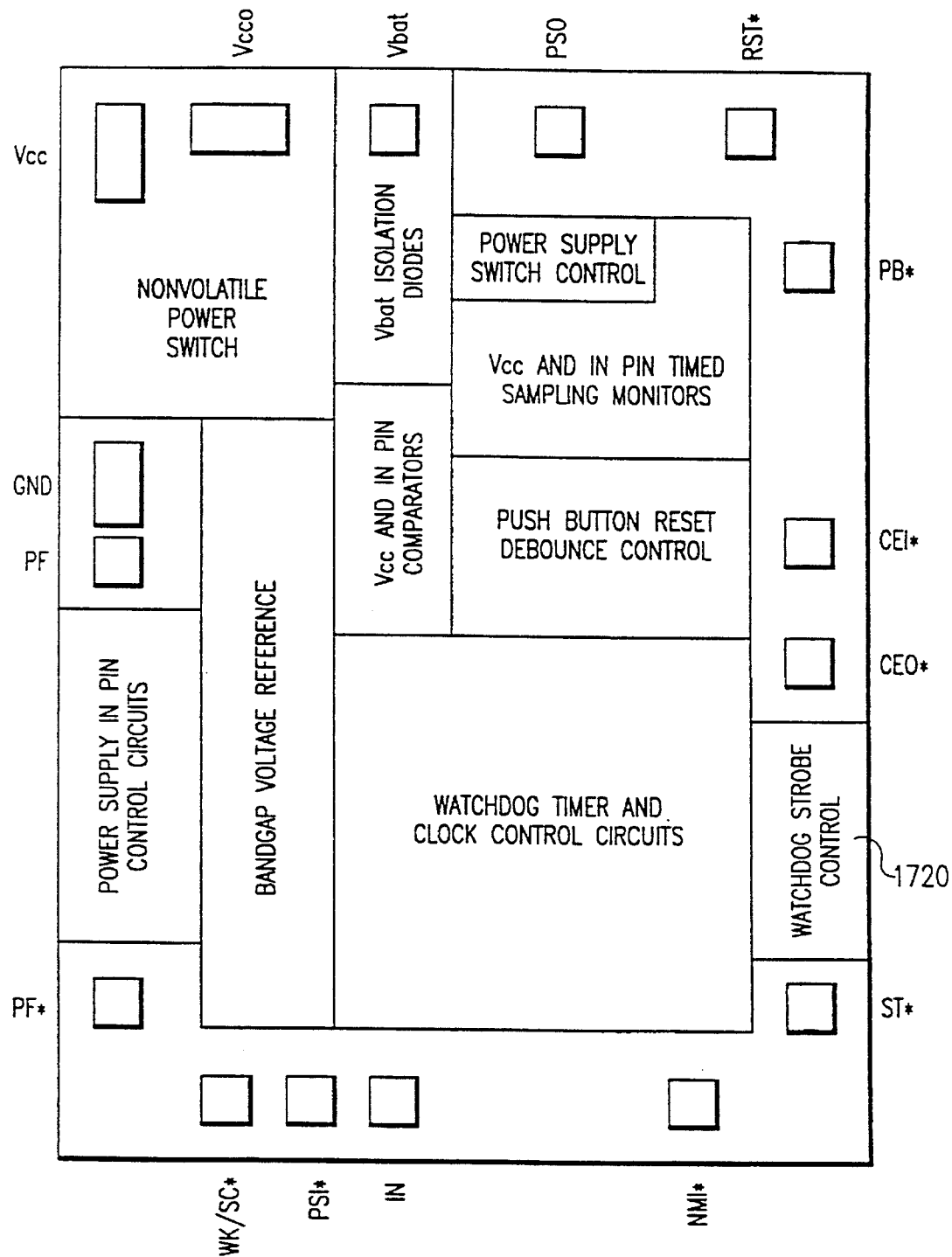
FIG. 17 shows the high-level layout of the auxiliary chip of the presently preferred embodiment.

FIG. 17 shows the high-level layout of the auxiliary chip of the presently preferred embodiment.

Elements corresponding to those shown in FIG. 13 are so indicated by corresponding reference numbers. In addition, note that a logic block 1720, which implements the timing relations between the watchdog and the ST* pin, is now shown separately. (This block is shown as part of block 300 in FIG. 13.)

Specific Voltage and Timing Parameters

The following tables give specific values for some of the voltage and timing parameters just referred to, as used in the specific context of the presently preferred embodiment. It must be understood that these specific values are given merely to provide a wealth of detail regarding the preferred embodiment, and for better understanding of FIGS. 6–9, and do not by any means delimit necessary features of the invention.

| ABSOLUTE MAXIMUM RATINGS: Voltage on any pin relative to ground −1.0 V to +7.0 V | |
|---|---|
| Operating Temperature | 0° C. to 70° C. |
| Storage Temperature | −55° C. to +125° C. |
| Soldering Temperature | 260° C. for 10 seconds |

| AC Electrical Characteristics (0°–7° C., $V_{CC}$ =4.5–5.5 V) | | | | | |
|---|---|---|---|---|---|
| Parameter | Symbol | MIN. | TYP. | MAX. | units |
| $V_{CC}$ Fail Detect to RST* | $t_{RPD}$ | | 50 | 100 | µs |
| $V_{TP}$ to NMI* | $t_{IPD}$ | 30 | 100 | 150 | µs |
| RESET Active Time | $t_{RST}$ | 50 | 100 | 150 | ms |
| NMI* Pulse Width[13] | $t_{NMI}$ | 200 | 300 | 500 | µs |
| ST* Pulse Width | $t_{ST}$ | 20 | | | ns |
| PBRST* @ $V_{IL}$ | $t_{PB}$ | 30 | | | ms |
| $V_{CC}$ Slew Rate 4.75 V to 4.25 V | $t_F$ | | 300 | | µs |
| Chap Enable Propagation Delay $t_{PD}$ | | | 20 | | ns |
| Chip Enable High to $V_{CC}$ Fail | $t_{CF}$ | 7 | 12 | 44 | ns |
| $V_{CC}$ Valid to RST* | $t_{FPU}$ | | | 100 | ns |
| $V_{CC}$ Valid to RST*[5] | $t_{RPU}$ | 50 | 100 | 150 | ms |
| $V_{CC}$ Slew 4.25 V to $V_{BAT}$[7] | $t_{FB1}$ | 10 | | | µs |
| $V_{CC}$ Slew 4.25 to $V_{BAT}$[8] | $t_{FB2}$ | 100 | | | µs |
| Chip Enable Output Recovery[9] | $t_{REC}$ | 0.1 | | | µs |
| $V_{CC}$ Slew 4.25 V to 4.75 V | $t_R$ | 0 | | | µs |
| Chip Enable Pulsewidth[10] | $t_{CE}$ | | | 5 | µs |
| Watch Dog Time Delay | $t_{TD}$ | 200 | 400 | 600 | ms |
| ST* to WK/SC* | $t_{WK}$ | 0.1 | | 50 | µs |
| $V_{BAT}$ Detect to PF, PF*[7] | $t_{PPF}$ | | | 2 | µs |
| ST* to NMI*[11] | $t_{STN}$ | | | 30 | ns |
| $V_{BAT}$ Detect to RST*[15] | $t_{ARST}$ | | | 200 | µs |
| $V_{CC}$ Valid to RST*[16] | $t_{BRST}$ | 30 | 100 | 150 | µs |
| PSI* to valid $V_{CC}$[15] | $t_{PSI}$ | | | 200 | ms |
| PSI* to PSO* tristate | $t_{PST}$ | | | 20 | ns |
| PSI* to Valid PSO* | $t_{PSO}$ | | | 100 | ns |
| PSO* Pulse Width | $t_{PSP}$ | 200 | | 500 | ms |

| Recommended DC Operating Conditions (0° C. to 70° C.) | | | | | |
|---|---|---|---|---|---|
| Parameter | Symbol | MIN. | TYP. | MAX. | units |
| Supply Voltage | $V_{CC}$[1] | 4.5 | 5.0 | 5.5 | V |
| Supply Voltage (5% option) | $V_{CC}$[1] | 4.75 | 5.0 | 5.5 | V |
| Input High Level | $V_{IH}$[1] | 2.0 | | $V_{CC}$ +0.3 | V |
| Input Low Level | $V_{IL}$[1] | −0.3 | | +0.8 | V |
| IN Input Pin | $V_{IN}$[1] | | | $V_{CC}$ | V |
| Battery Input | $V_{BAT}$[1] | 2.7 | | 4.0 | V |

| DC Electrical Characteristics (0° C. to 70° C., $V_{CC}$ = 4.5–5.5 V) | | | | | |
|---|---|---|---|---|---|
| PARAMETER | Symbol | MIN. | TYP. | MAX. | units |
| Supply Current[2] | $I_{CC}$ | | | 4 | mA |
| Supply Current Output[3] | $I_{CCO1}$ | | | 100 | mA |
| Supply Voltage Output[1] | $V_{CCO}$ | $V_{CC}$−0.3 | | | V |
| Input Leakage | $I_{LI}$ | −1.0 | | +1.0 | µA |
| Output Leakage | $I_{LO}$ | −1.0 | | +1.0 | µA |
| Output Current @ 0.4 V[12] | $I_{OL}$ | | | 4.0 | mA |
| Output Current @ 2.4 V | $I_{OH}$ | −1.0 | | | mA |
| Power Supply Trip Point[1] | $V_{CCTP}$ | 4.25 | 4.37 | 4.50 | V |
| Power Supply Trip Point (5% option)[1] | $V_{CCTP}$ | 4.50 | 4.62 | 4.75 | V |

-continued

| DC Electrical Characteristics (0° C. to 70° C., $V_{CC}$ = 4.5–5.5 V) | | | | | |
| --- | --- | --- | --- | --- | --- |
| PARAMETER | Symbol | MIN. | TYP. | MAX. | units |
| IN Input Pin Current | $I_{CCIN}$ | −1.0 | | +1.0 | µA |
| IN Input Trip Point | $V_{TP}$ | 2.5 | 2.54 | 2.6 | V |
| Battery Backup Current[4] | $I_{CCO2}$ | | | 1.0 | mA |
| Battery Backup Current[1,6] | $V_{CCO}$ | $V_{BAT}$−.7 | | | V |
| Battery Current[2] | $I_{BAT}$ | | | 0.1 | µa |
| CE* and PF Output Voltage[1,6] | $V_{OHL}$ | $V_{BAT}$−.7 | | | V |

| CAPACITANCE ($t_A$ = 25°) | | | | | |
| --- | --- | --- | --- | --- | --- |
| PARAMETER | Symbol | MIN. | TYP. | MAX. | units |
| Input Capacitance | $C_{IN}$ | | | 5 | pF |
| Output Capacitance | $C_{OUT}$ | | | 7 | pF |

Notes to the Tables
[1] All votages are referenced to ground.
[2] This parameter is measured with $V_{CCO}$, CEO*, PF, ST*, PBRST*, PSI*, PSO*, RST, and NMI* pins open.
[3] $I_{CCO1}$ is the maximum average load which the auxiliary chip can supply, at a voltage of $V_{CC}$−0.3 V, through the $V_{CCO}$ pin during normal 5 volt operation.
[4] $I_{CCO2}$ is the maximum average load which the auxiliary chip can supply through the $V_{CCO}$ pin during data retention battery supply operation, with a maximum voltage drop of 8 Volts.
[5] With $t_R$ = 5 µs.
[6] $V_{CCO}$ is approximately $V_{BAT}$−0.5 V at 1 microAmp load.
[7] Sleep mode is not invoked.
[8] Sleep mode is invoked.
[9] $t_{RCE}$ is the minimum time required before CEI*/CEO* memory access is allowed.
[10] $t_{CE}$ maximum must be met to insure data integrity on power loss.
[11] When IN input is less than $V_{TP}$, but $V_{CC}$ is greater than $V_{CCTP}$.
[12] All outputs except: RST*, which is 50 microA max; PSI*, which is 10 µA typical; and PSO*, which is 10 mA max.
[13] NMI* minimum pulse width of 200 µs requires that the input level to the IN pin be maintained at a level below $V_{TP}$.
[14] CEI* low.
[15] Minimum turn-on response time for AC to DC power supply.
[16] PSO* pulse width when $V_{CC}$ held below $V_{BAT}$.

Timing Relations at Power-Up and Power-Dowel

Figure 6:
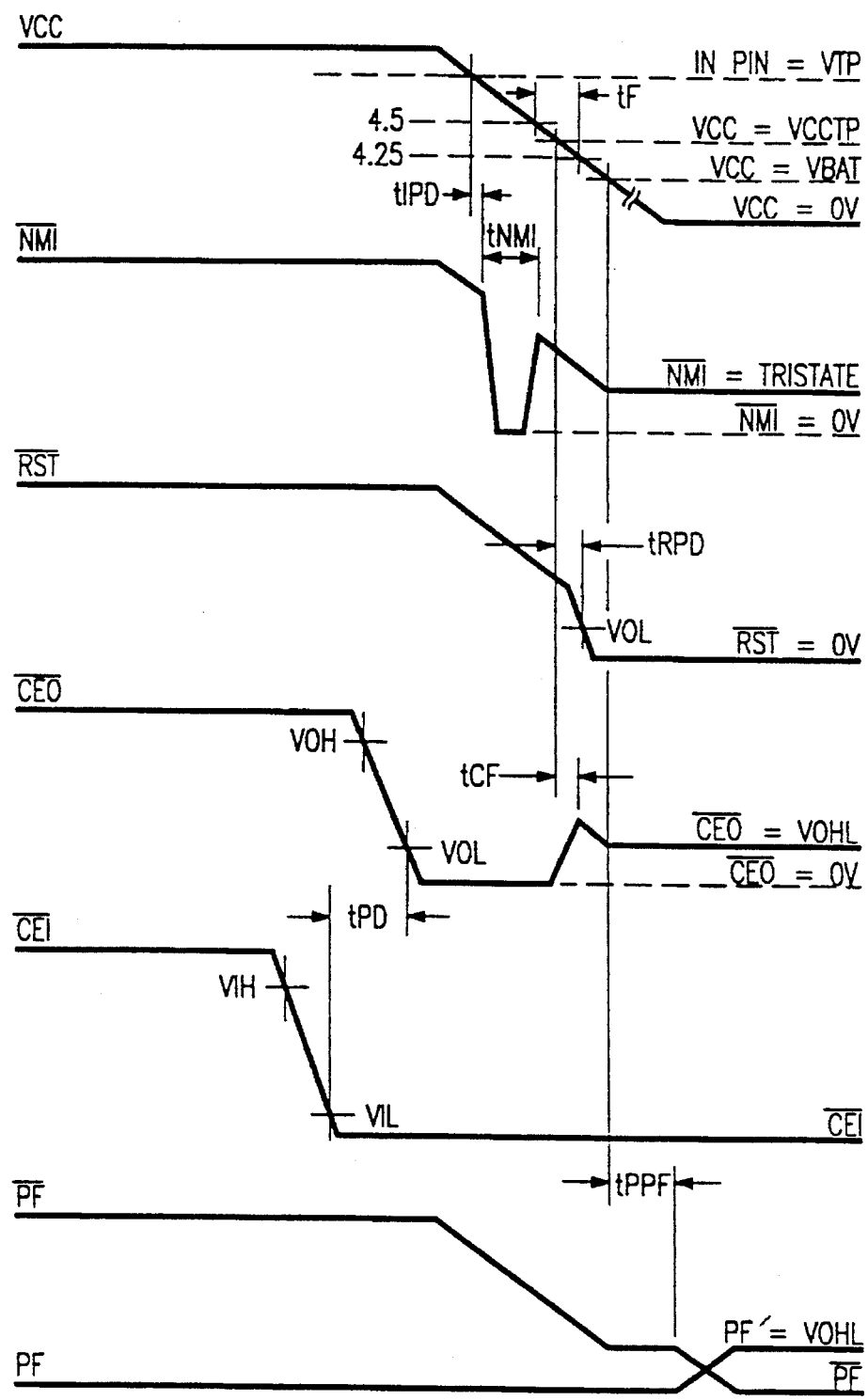
FIG. 6 shows the power-down timing relations in the presently preferred embodiment.
Figure 7:
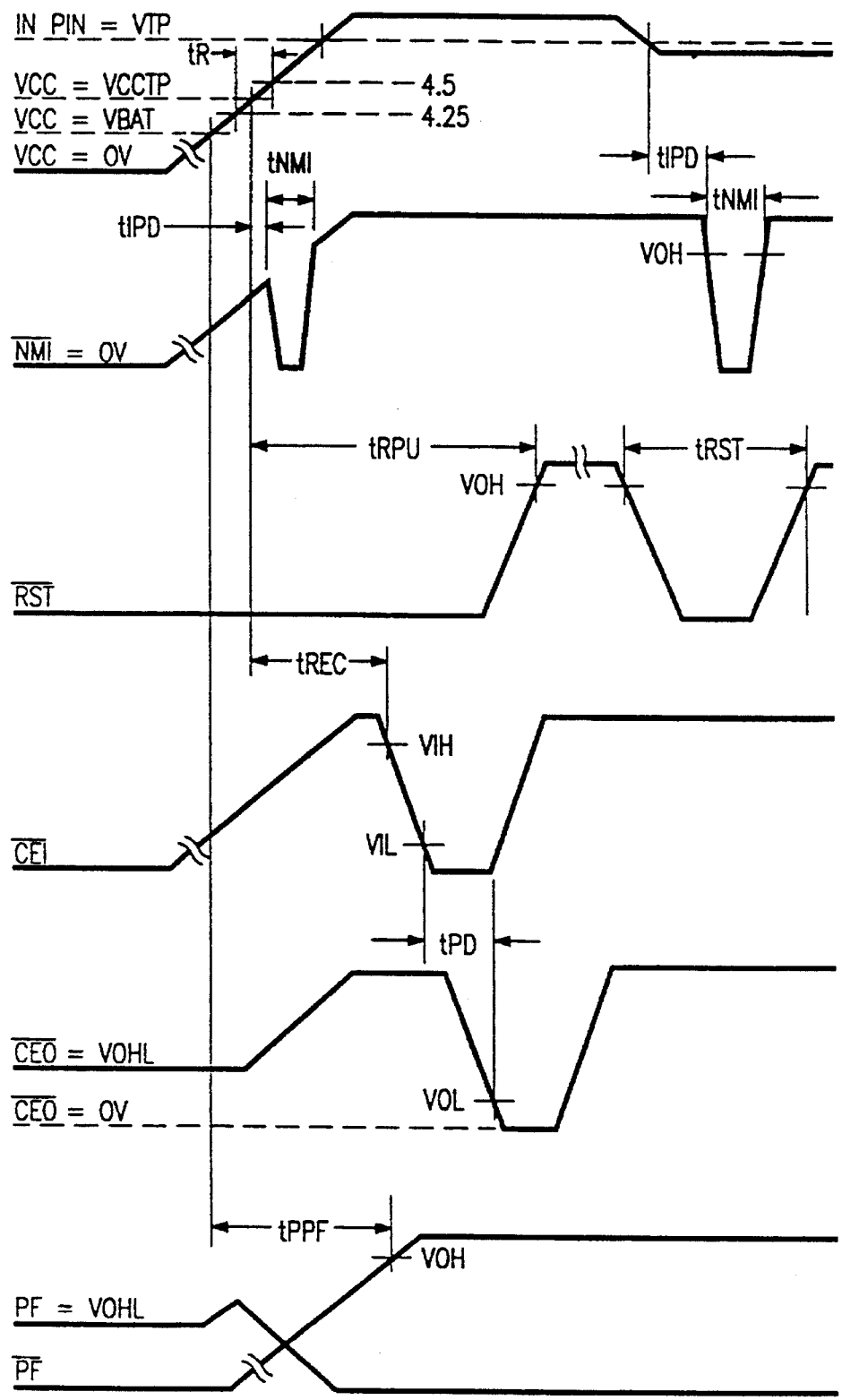
FIG. 7 shows the power-up timing relations in the presently preferred embodiment.

FIGS. 6 and 7 schematically show the timing relations discussed above. The top two lines of FIG. 6 show how the NMI* line fall below $V_{OL}$ within a duration $t_{IPD}$ after the voltage at pin IN (referenced to $V_{CC}$) falls below voltage $V_{TP}$, and will remain low for $t_{NMI}$ before going to a tristate (high-impedance) condition.

The remainder of FIG. 6 shows the timing relations by which RST*, PF, and PF* depend on $V_{CC}$, and CLEO* depends on $V_{CC}$ and CEI*, during power-down.

The bottom six lines of FIG. 6 are not necessarily synchronized to the top two. In fact, since the effective time constant of the main power supply may be hundreds or thousands of milliseconds under light load conditions, the decline of $V_{CC}$ may not occur until long after the IN input falls, if the IN input is connected to track the power line voltage (as is preferable). Note that this Figure also illustrates the timing relations of the chip enable signals CEO* and CEI*, showing how the chip enable output CEO* is inhibited after power supply failure.

Similarly, FIG. 7 shows the timing relations by which NMI*, PF, and PF* depend on $V_{CC}$ and CEO* depends on $V_{CC}$ and CEI*, during power-up.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the microprocessor's programming can use the power-down warning interrupt to trigger a state-save operation.

For another example, the disclosed auxiliary chip can be used with a wide variety of microprocessors, microcontrollers, or microcomputers, including ones which do and ones which do not have their own battery back-up supplies; 8-bit, 16-bit, 32-bit, or other architectures; general-purpose processors, DSPs (digital signal processors), or ASICs (application-specific integrated circuits); numeric or symbolic processors; and others.

For another example: a wide range of system contexts are enabled by the disclosed inventions, including (for example) portable computers, device controllers, desk-top computers, sub-processors which perform management functions in minicomputer, mainframe, or even supercomputer systems.

For another example: the switch which the user touches to power-up the system need not be a conventional single-pole normally-open switch, but instead could be a one-terminal switch (which senses loading by a user's body capacitance), or a touch-switch panel over a display screen, or other configuration.

For another example: the main power supply, which is controlled by the startup logic which is activated by the low-voltage user-activated switch, could alternatively be a DC-DC conversion circuit rather than an AC power supply. This may be particularly advantageous in portable computers.

For another example: portable computer systems may optionally use both an auxiliary integrated circuit, as described herein, and an ancillary circuit, as described in U.S. patent application Ser. No. 359,381, filed May 31, 1989, which is hereby incorporated by reference. This may be particularly advantageous in portable computer systems. As will be recognized by those skilled in the art, the innovative concepts described in the present application can be modified and varied over a tremendous range of applications, and accordingly their scope is not limited except by the allowed claims.

What is claimed is:

1. A circuit, for connection to an external contact pad, comprising:
    a battery;
    a power supply connected to receive current from an AC line;
    a switch separate from said battery, said switch connected to disconnect said power supply from said AC line;
    logic connected to detect a voltage transition on said external contact pad, such as may be caused when a user touches said external contact pad, and to selectively operate said switch when said voltage transition is detected, said logic being connected to be operated from said battery when said power supply is inoperative; and
    at least one microprocessor connected to be powered by said power supply, wherein said external contact pad is electrically isolated from said power supply.

2. The circuit of claim 1, wherein said load element is a weak transistor.

3. The circuit of claim 1, wherein said load element is connected to pull up the potential of said contact pad.

4. An integrated circuit, for connection to an external contact pad, to a system power supply, and to at least one associated integrated circuit, comprising:
    a comparator electrically coupled to monitor the voltage of an external power supply connection with reference to a reference-voltage source;
    a watchdog timer circuit electrically coupled to generate an interrupt if activity is not detected on an input pin for a predetermined period of time;
    a battery power supply input connection for receiving a battery voltage;
    a system power supply input connection for receiving a power supply voltage; and
    logic connected to detect a voltage transition on said external contact pad, such as may be caused when a user touches said external contact pad, and to selectively operate a power switch when a falling edge is detected, said logic being connected to be powered from said battery power supply input connection when said power supply is inoperative, and including a load element connected to pull said external contact pad element toward said battery power supply input, said external contact pad electrically isolated from said power supply.

5. The integrated circuit of claim 4, wherein said load element is a weak transistor.

6. The integrated circuit of claim 4, comprising multiple comparators electrically coupled to receive said external power supply connection as an input thereto.

7. The integrated circuit of claim 4, wherein said load element is electrically coupled to pull up the potential of said external contact pad.

8. The integrated circuit of claim 4, wherein said reference-voltage source is a bandgap-voltage-reference circuit.

9. The integrated circuit of claim 4, further comprising chip-enable control logic, electronically coupled to receive an externally generated chip-enable input signal, and to provide corresponding chip-enable outputs externally only if said comparator indicates that an external power supply voltage is sufficiently near a target voltage.

10. The integrated circuit of claim 4, further comprising sleep control logic, electronically coupled to place said integrated circuit into a sleep mode by disabling multiple circuits thereof, including said watchdog timer circuit, in accordance with a sleep command received from an associated integrated circuit.

11. A system, comprising:
    a complex programmable logic integrated circuit;
    a power supply;
    an electrically controllable switch, separate from said battery., said switch operable to connect said power supply to an alternating current power line;
    an externally accessible contact pad;
    a battery; and
    an auxiliary integrated circuit, comprising:
        a battery power supply input electrically coupled to receive a supply voltage from said battery;
        a system power supply input electrically coupled to receive a system supply voltage from said power supply;
        a comparator electrically coupled to monitor a first voltage of an external power supply connection with reference to a second voltage of a reference-voltage source;
        a watchdog timer circuit electrically coupled to generate an interrupt if activity is not detected on an input pin for a predetermined period of time;
        logic electrically coupled to detect a voltage transition on the external contact pad, such as may be caused when a user touches said external contact pad and to selectively operate said electrically controllable switch when a falling edge is detected, said logic being connected to be powered from said battery power supply input connection when said power supply is inoperative, said external contact pad electrically isolated from said power supply;
    wherein said auxiliary integrated circuit is connected to provide both reset and interrupt signals to said complex programmable logic integrated circuit.

12. The system of claim 11, wherein said complex programmable logic integrated circuit is a microprocessor.

13. The system of claim 11, wherein said voltage comparison circuit comprises multiple comparators.

14. The system of claim 11, wherein said reference-voltage source is a bandgap- voltage-reference.

15. The system of claim 11, wherein said auxiliary integrated circuit is connected to provide both reset and interrupt signals to said microprocessor.

16. The system of claim 11, wherein said auxiliary integrated circuit is connected to monitor a voltage whose magnitude corresponds directly, with a relatively short time constant, to the magnitude of the power line voltage.

17. The system of claim 11, wherein said power supply includes a DC to DC converter.

18. The system of claim 11, wherein said voltage transition detect logic will cease to operate said switch if said power supply has not become fully operative within a predetermined minimum time after a falling edge is detected.

19. A system that connects to an external contact pad, comprising
(a) a battery;
(b) a high-impedance load element powered by said battery and electrically coupled to pull a voltage potential of said external contact pad in a particular direction;
(c) a power supply electrically coupled to receive current from an AC line, said power supply carrying a voltage;
(d) a switch separate from said battery, said switch electrically coupled to disconnect said power supply from said AC line, said switch electrically isolated from said power supply;
(e) logic module electrically coupled to detect a voltage transition on said external contact paid caused when a user touches said external contact pad and to selectively operate said switch when said voltage transition is detected, said logic module also electrically coupled to said battery and said power supply; and
(f) at least one microprocessor electrically coupled to be powered by said power supply.

20. The system of claim 19, wherein said high-impedance load element is a weak transistor.

21. The system of claim 19, wherein said high-impedance load element is connected to pull up the potential of said external contact pad.

* * * * *